United States Patent
Zhai et al.

(10) Patent No.: US 11,327,543 B2
(45) Date of Patent: May 10, 2022

(54) POWER CONVERTER DEVICE HEALTH CHECK SYSTEM

(71) Applicant: Dell Products L.P., Round Rock, TX (US)

(72) Inventors: Haifang Zhai, Shanghai (CN); Wei Dong, Shanghai (CN); Xizhi Cui, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 312 days.

(21) Appl. No.: 16/671,660

(22) Filed: Nov. 1, 2019

(65) Prior Publication Data

US 2021/0072809 A1    Mar. 11, 2021

(30) Foreign Application Priority Data

Sep. 9, 2019  (CN) .......................... 201910847125.0

(51) Int. Cl.
  *G06F 1/28* (2006.01)
  *H02M 3/158* (2006.01)

(52) U.S. Cl.
  CPC .............. *G06F 1/28* (2013.01); *H02M 3/158* (2013.01)

(58) Field of Classification Search
  CPC . G06F 1/28; H02M 1/32; H02M 1/36; H02M 3/158; H02M 3/1584; G01R 19/165; G01R 31/50; H02H 7/20; H02H 1/0007; H02H 3/08; H02H 7/1213
  See application file for complete search history.

(56) References Cited

U.S. PATENT DOCUMENTS

| | | | |
|---|---|---|---|
| 2003/0071587 A1* | 4/2003 | Suzuki ................... | B62D 5/046 318/139 |
| 2005/0024032 A1* | 2/2005 | Yamamoto .............. | H02M 1/32 323/282 |
| 2013/0227309 A1* | 8/2013 | Jau ........................ | H05K 7/1492 713/300 |
| 2014/0362478 A1* | 12/2014 | Kuo ...................... | H02H 11/005 361/18 |
| 2018/0034386 A1* | 2/2018 | Okuda ................... | H02M 3/155 |
| 2018/0183364 A1* | 6/2018 | Lee ........................... | H02P 7/04 |

* cited by examiner

*Primary Examiner* — Jaweed A Abbaszadeh
*Assistant Examiner* — Brian J Corcoran
(74) *Attorney, Agent, or Firm* — Joseph Mencher

(57) ABSTRACT

A power converter device health check system includes a circuit that connects a power input to a power output, and that includes a first transistor directly coupled to ground and a capacitor in parallel with the first transistor. A controller device is coupled to the circuit and, during boot operations, prevents first power from being provided to the first transistor via the power input, and turns off the first transistor. While preventing the first power from being provided to the first transistor and with the first transistor turned off, the controller device provides second power to a circuit location in the circuit between the first transistor and the capacitor, and then determines whether a charge of the capacitor is below a threshold charge level. If the capacitor is below the threshold charge level, the controller device transmits a power converter warning message.

20 Claims, 11 Drawing Sheets

POWER CONVERTER DEVICE HEALTH CHECK SYSTEM

CROSS-REFERENCE TO RELATED APPLICATIONS

This application claims priority to Chinese Application Serial No. 201910847125.0, filed Sep. 9, 2019, the disclosure of which is incorporated herein by reference in its entirety.

BACKGROUND

The present disclosure relates generally to information handling systems, and more particularly to performing a health check on a power converter device in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, sometimes utilize power converter devices for converting power received from a power supply system from a first power level to a second power level. For example, many server devices include power backup devices for addressing power losses to components in the server device, and those power backup devices operate as power converter devices to convert power as discussed above. In a specific example, Battery Backup Unit (BBU) devices are often provided for memory systems (e.g., Dynamic Random Access Memory (DRAM) devices) in server devices in order to provide ride-through capability for the BBU device and memory system, which refers to the ability of the BBU device to deliver usable power to the memory system for a limited time during a power loss, with that usable power provided via a power conversion by the BBU device using power received from a power supply system. As such, conventional BBU devices provide the converted power amount for the ride-through time to their memory system in the event of a power loss such that, in the event power is restored within that ride-through time, the memory system operates without interruption while, in the event the power loss continues beyond that ride-through time, the memory system begins vaulting operations that transfer the data on the memory system to a storage system (e.g., Solid State Drives (SSDs)) in the server device.

However, conventional power converter devices such as the BBU devices discussed above (as well as other DC/DC power converter devices and/or other power converter devices known in the art) can be subject to failure in the event they are manufactured with faulty components. For example, BBU devices typically include a charging circuit with a power input, an input gate, a power converter portion, and a power output that is connected to the power storage subsystem (e.g., a battery pack) in the BBU device. The power converter portion of the charging circuit typically utilizes low-side Metal-Oxide-Semiconductor Field-Effect Transistors (MOSFET) devices that are directly coupled to ground, as well as to high-side MOSFET devices that are directly coupled to the power output of the charging circuit. It has been found that faulty MOSFET devices may be manufactured such that they provide a short circuit, and providing those faulty MOSFET devices as the low-side MOSFET devices in the power converter portion of the charging circuit discussed above can result in failure the BBU device.

For example, when 12 volts of power is provided to the power input of the charging circuit, a short circuit exists in a low-side MOSFET device in the power converter portion of the charging circuit, and the corresponding high-side MOSFET device is turned on, the 12 volts of power will short to the ground directly coupled to that low-side MOSFET device, which can cause the charging circuit, power storage subsystem, and/or other components of the BBU device to fail. Furthermore, MOSFET devices are not typically monitored for such short circuits before they are provided in the power converter portion of the charging circuit, and conventional server devices/BBU devices power-on with the high-side MOSFET device turned on and 12 volts of power provided to the power input of the charging circuit, so the short circuit in the low-side MOSFET device is only detected once it has caused the failure of the BBU device, resulting in BBU device downtime that raises the possibility of data loss in the memory devices discussed above, as well as costs and time associated with the replacement of the BBU device.

Accordingly, it would be desirable to provide for power converter device health checks that address the issues discussed above.

SUMMARY

According to one embodiment, an Information Handling System (IHS) includes a processing system; and a memory system that is coupled to the processing system and that includes instructions that, when executed by the processing system, cause the processing system to provide a controller engine that is configured to: prevent first power from being provided via a power input to a first transistor in a circuit that is directly coupled to ground; turn off the first transistor; provide, while preventing the first power from being provided to the first transistor via the power input and with the first transistor turned off, second power to a circuit location in the circuit between the first transistor and a capacitor in the circuit that is in parallel with the first transistor; determine, subsequent to providing the second power to the circuit location in the circuit between the first transistor and the capacitor, whether a charge of the capacitor is below a threshold charge level; and transmit, in response to determining that the charge of the capacitor is below the threshold charge level, a power converter warning message.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
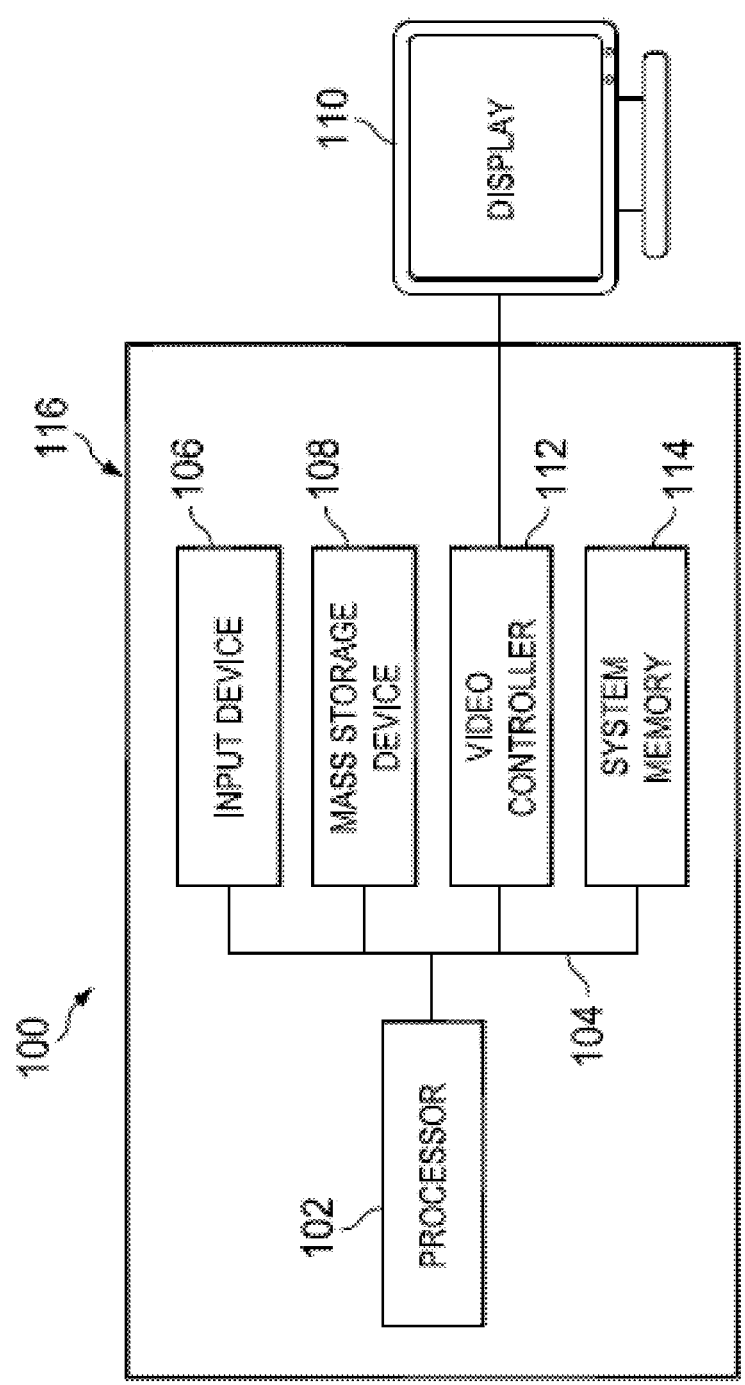
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
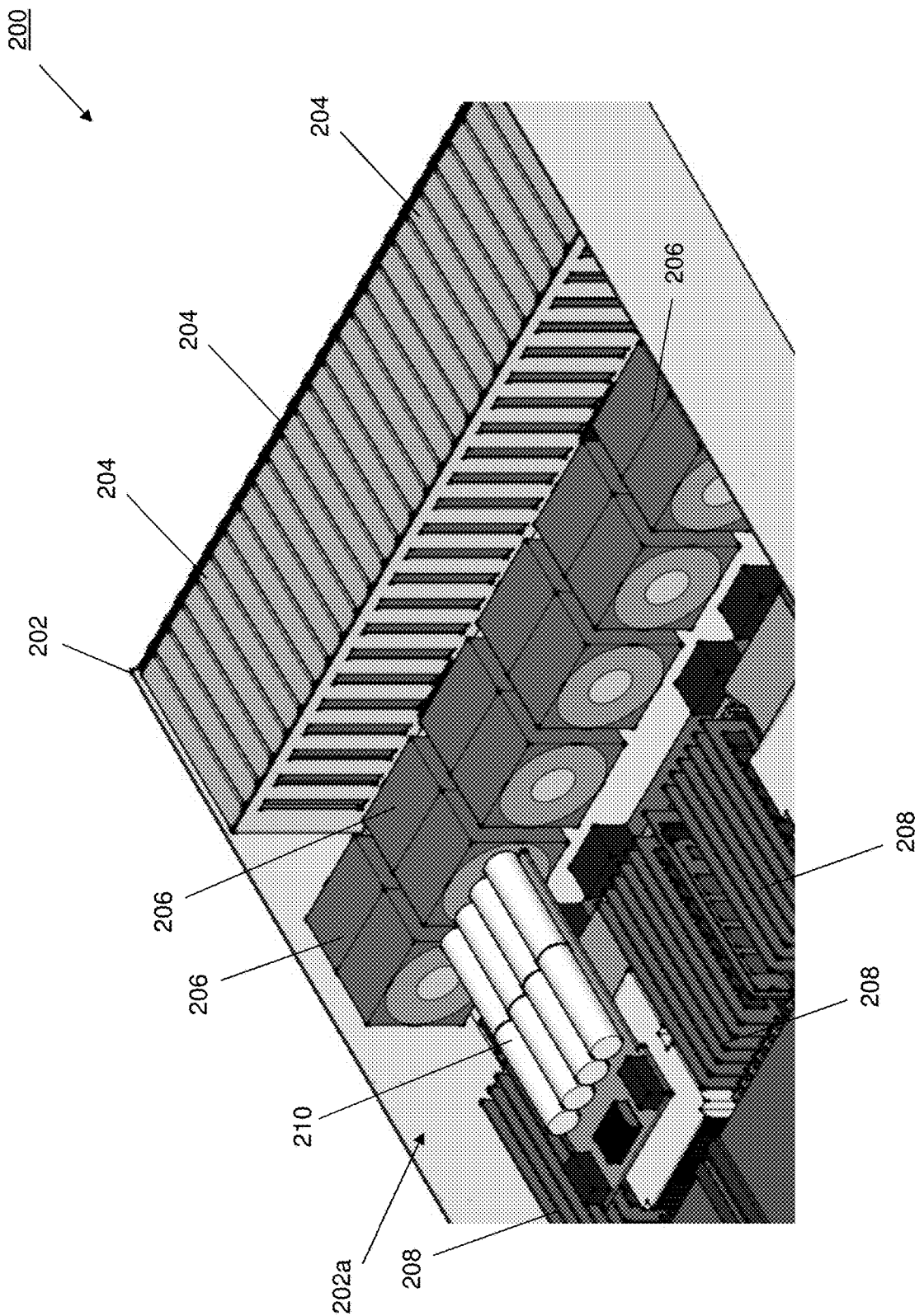
FIG. 2 is a perspective view illustrating an embodiment of a server device that may include the power converter device health check system of the present disclosure.

Referring now to FIG. 2, an embodiment of a server device 200 is illustrated. In an embodiment, the server device 200 may be provided by the IHS 100 discussed above with reference to FIG. 1, and/or may include some or all of the components of the IHS 100. However, while illustrated and discussed as provided in a server device 200, one of skill in the art in possession of the present disclosure will recognize that the power converter device health check system of the present disclosure may be provided in a variety of different devices (e.g., networking devices, storage devices, desktop computing devices, laptop/notebook computing devices, and/or other computing devices that would be apparent to one of skill in the art in possession of the present disclosure) while remaining within the scope of the present disclosure as well. In the illustrated embodiment, the server device 200 includes a chassis 202 that defines a chassis housing 202a which, as discussed below, may house any or all of the components of the server device 200.

In the illustrated embodiment, a plurality of components 204 are located in the chassis housing 202a. For example, in some examples the components 204 may be provided by storage devices such as Solid State Drives (SSDs), Hard Disk Drives (HDDs), and/or any other storage device known in the art. However, while described as storage devices, one of skill in the art in possession of the present disclosure will recognize that the components may be provided by any server devices component known in the art while remaining within the scope of the present disclosure as well. Furthermore, FIG. 2 illustrates a plurality of fan devices 206 located in the chassis housing 202a adjacent the components 204, as well as a plurality of memory devices 208 that are located in the chassis housing 202a and opposite the fan devices 206 from the components 204, and a power converter device that, in the illustrated embodiment, is provided by a Battery Backup Unit (BBU) device 210 that is located in the chassis housing 202a and opposite the fan devices 206 from the components 204. However, while discussed as a BBU device below, one of skill in the art in possession of the present disclosure will recognize that the BBU device 210 may be replaced by any of a variety of power converter device technologies (e.g., DC/DC power converter devices such as the 2-direction DC/DC power converter device provided by the BBU device in the examples below, buck power converter devices, boost power converter devices, buck/boost power converter devices, and/or any other power converter devices that would be apparent to one of skill in the art in possession of the present disclosure) while remaining within the scope of the present disclosure as well. While a specific server device 200 has been illustrated and described, one of skill in the art in possession of the present disclosure will recognize that the devices providing the power converter device health check system of the present disclosure may include a variety of components and component configurations while remaining within the scope of the present disclosure as well.

Figure 3:
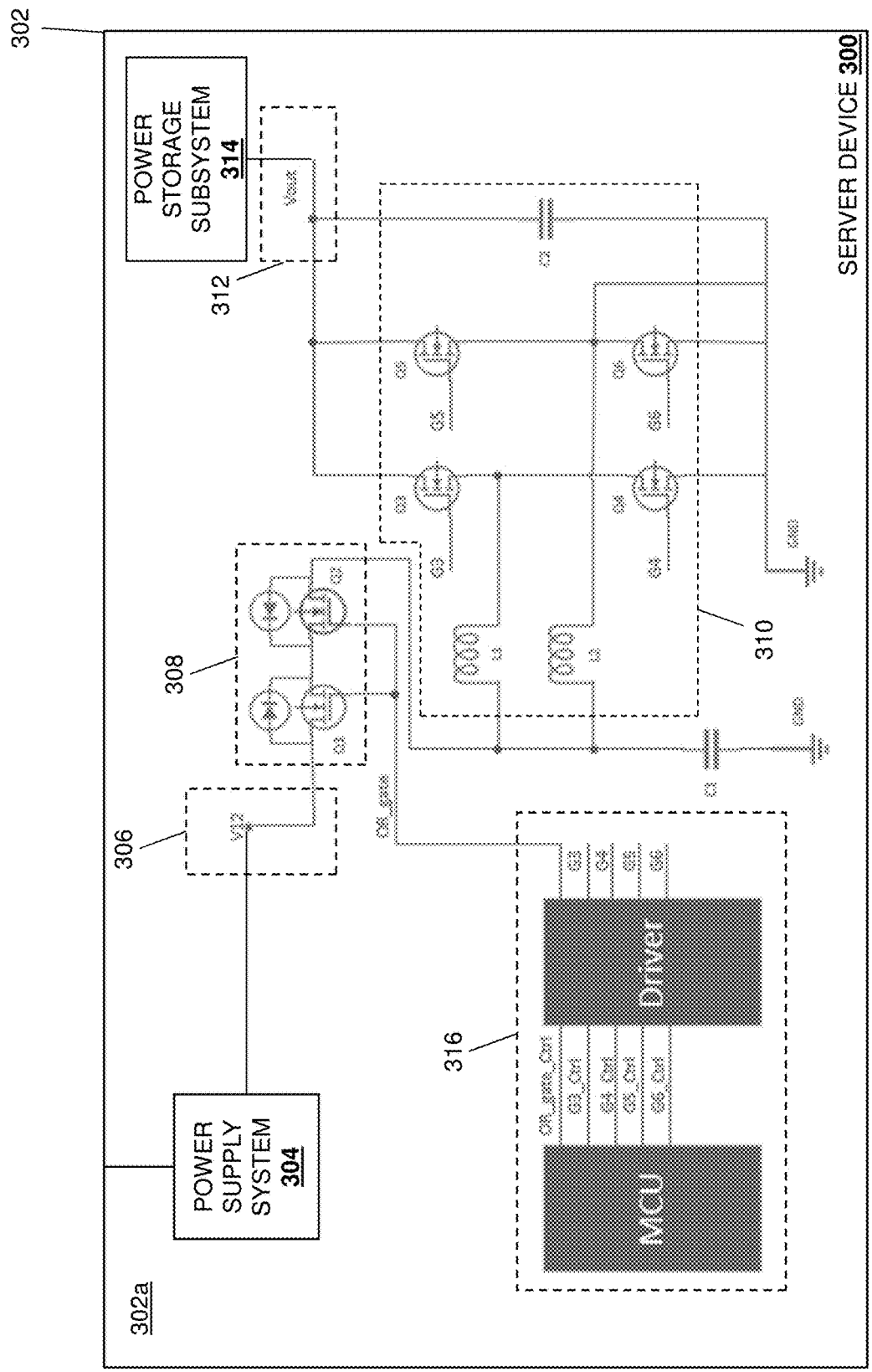
FIG. 3 is a schematic view illustrating an embodiment of a server device that includes a conventional power converter device.

Referring now to FIG. 3, an embodiment of a server device 300 is illustrated that is similar to the server device 200 discussed above with reference to FIG. 2 and provided for purposes of the examples discussed below. In an embodiment, the server device 300 may be provided by the IHS 100 discussed above with reference to FIG. 1, and/or may include some or all of the components of the IHS 100. However, while illustrated and discussed as provided in a server device 300, one of skill in the art in possession of the present disclosure will recognize that the conventional power converter device/BBU device in the server device 300 described below may be provided in a variety of different devices (e.g., networking devices, storage devices, desktop computing devices, laptop/notebook computing devices, and/or other computing devices that would be apparent to one of skill in the art in possession of the present disclosure) while remaining within the scope of the present disclosure as well. In the illustrated embodiment, the server device 300 includes a chassis 302 that defines a chassis housing 302a that houses some or all of the components of the server device 300 as discussed below.

In the illustrated embodiment, the server device 300 includes a power supply system 304 that is located in the chassis housing 302a and that may be provided by a plurality of Power Supply Units (PSUs) and/or other power supply components that would be apparent to one of skill in the art in possession of the present disclosure. As illustrated in FIG. 3, the power supply system 304 is coupled to a circuit that includes a power input 306, an input gate 308, a power converter 310, and a power output 312. In the illustrated embodiment, a power storage subsystem 314 is coupled to the power output 312 in the circuit, and may be provided by a battery, battery pack, and/or any other power storage subsystem that would be apparent to one of skill in the art in possession of the present disclosure. Furthermore, FIG. 3 illustrates how a controller system 316 may be coupled to the input gate 308 and the power converter 310 in the circuit.

In the specific example illustrated in FIG. 3, the power input 306 is coupled to the power supply system 304 and is configured to receive 12 volts of power from the power supply system 304, and the power output 312 is coupled to the power storage subsystem 314 and is configured to provide converted power to the power storage subsystem 314. The input gate 308 is coupled to the power input 306 and includes a transistor Q1 (e.g., a MOSFET device) and a transistor Q2 (e.g., a MOSFET device) that are each provided in parallel with respective diodes included in the input gate 308, and that are each coupled to the controller system 316. The power converter 310 is coupled to the input gate 308, the controller system 316, and the power output 312, and includes a pair of inductors L1 and L2. Furthermore, the power converter 310 includes a high-side transistor Q3 (e.g., a MOSFET device) provided between the power output 312 and a low-side transistor Q4 (e.g., a MOSFET device) that is directly coupled to ground GND (with the inductor L1 coupled between the high-side transistor Q3 and the low-side transistor Q4), and a high-side transistor Q5 (e.g., a MOSFET device) provided between the power output 312 and a low-side transistor Q6 (e.g., a MOSFET device) that is directly coupled to ground GND (with the inductor L2 coupled between the high-side transistor Q5 and the low-side transistor Q6). Further still, a capacitor C2 is provided between the power output 312 and ground GND, and in parallel with each of the high-side transistor Q3/low-side transistor Q4 combination, and the high-side transistor Q5/low-side transistor Q6 combination (with the inductor L2 coupled between the capacitor C2 and ground GND). Finally, a capacitor C1 is provided between the input gate 308 and ground GND, and in parallel with the inductors L1 and L2.

As discussed above, the controller system 316 is coupled to each of the input gate 308 and the power converter 310, and includes a MicroController Unit (MCU) and a Driver. For example, the Driver is illustrated in FIG. 3 as being connected to each of the transistors Q1 and Q2 via an OR gate, and well as including a connection G3 to the transistor Q3, a connection G4 to the transistor Q4, a connection G5 to the transistor Q5, and a connection G6 to the transistor Q6. As will be appreciated by one of skill in the art in possession of the present disclosure, the MCU is configured to control the Driver, and includes an OR gate Ctrl connection to the Driver, a G3 Ctrl connection to the Driver, a G4 Ctrl connection to the Driver, a G5_Ctrl connection to the Driver, and a G6_Ctrl connection to the Driver. However, while a specific circuit and configuration for the power converter device is illustrated in FIG. 3, one of skill in the art in possession of the present disclosure will recognize that conventional power converter devices may include a variety of configurations that will benefit from the teachings of the present disclosure as well.

Figure 4:
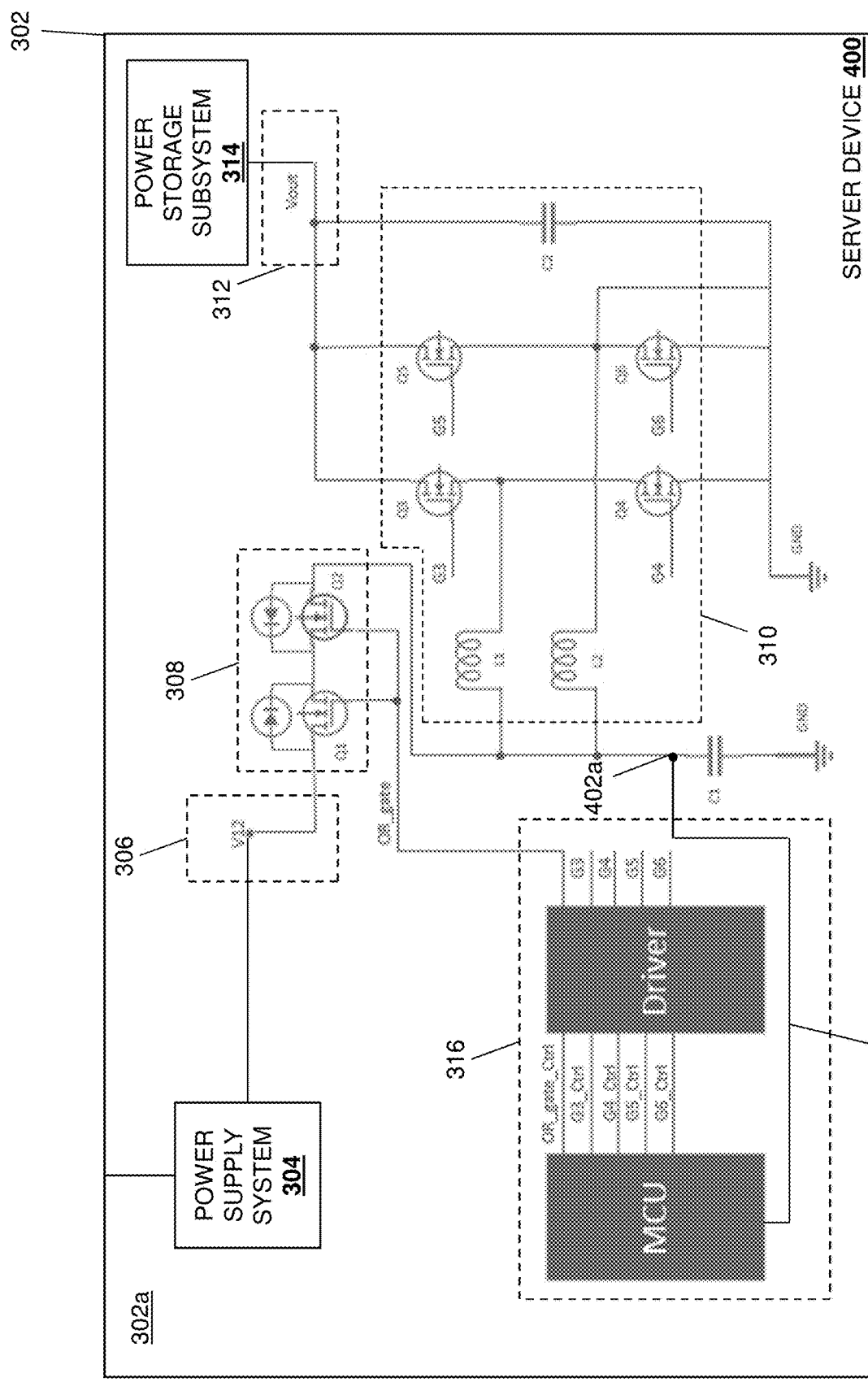
FIG. 4 is a schematic view illustrating an embodiment of a server device that includes the power converter device health check system of the present disclosure.

Referring now to FIG. 4, an embodiment of a server device 400 is illustrated that is similar to the server device 200 discussed above with reference to FIG. 2 and provided for purposes of the examples discussed below. In an embodiment, the server device 400 may be provided by the IHS 100 discussed above with reference to FIG. 1, and/or may include some or all of the components of the IHS 100. However, while illustrated and discussed as provided in a server device 400, one of skill in the art in possession of the present disclosure will recognize that the power converter device health check system described below may be provided in a variety of different devices (e.g., networking devices, storage devices, desktop computing devices, laptop/notebook computing devices, and/or other computing devices that would be apparent to one of skill in the art in possession of the present disclosure) while remaining within the scope of the present disclosure as well. In the illustrated embodiment, the server device includes each of the components of the server device 300 that are provided with the same element numbers in FIG. 4, along with some additional components for providing the power converter device health check functionality discussed below.

Figure 5:
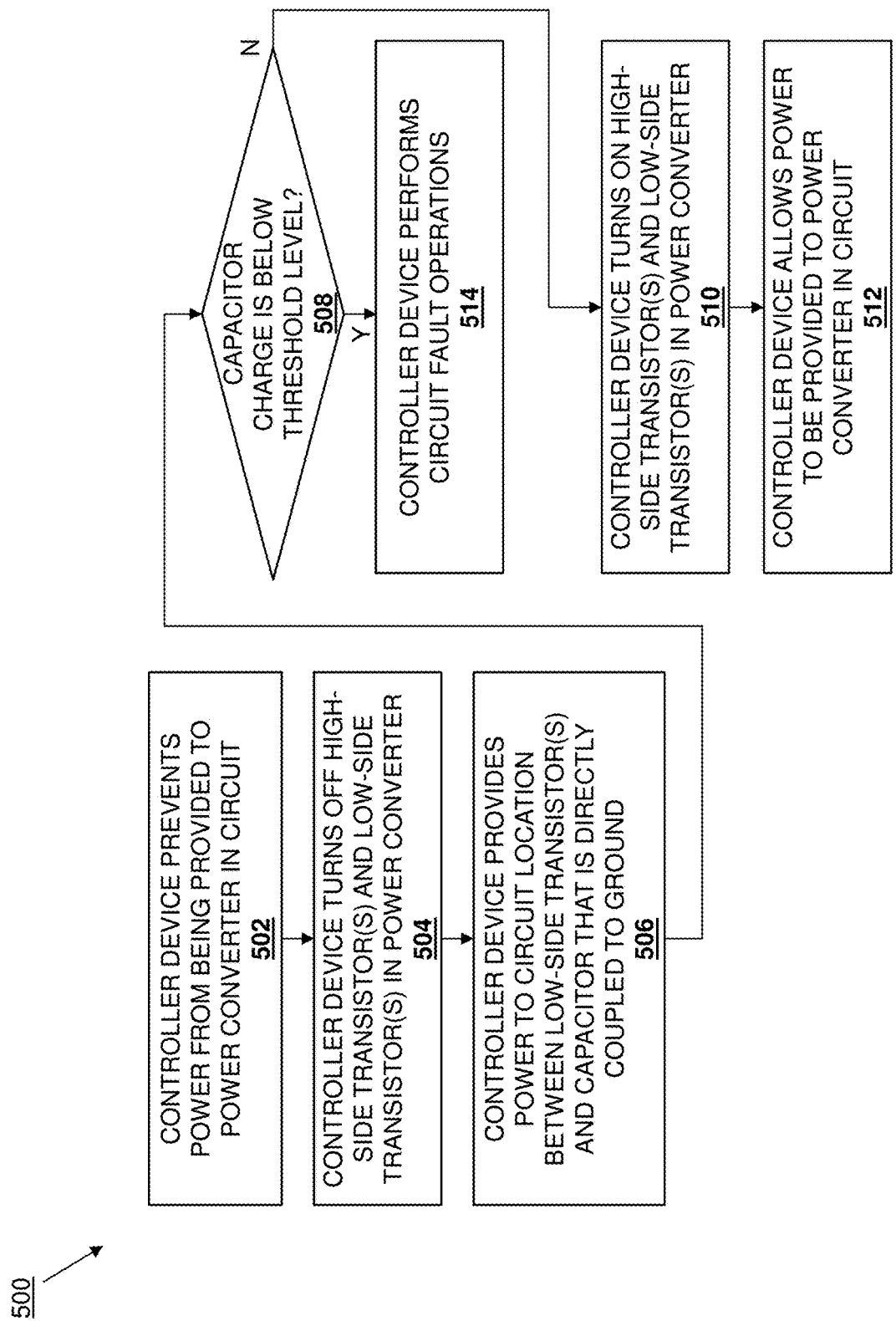
FIG. 5 is a flow chart illustrating an embodiment of a method for performing power converter device health checks.

As such, the server device 400 includes the chassis 302 defining the chassis housing 302a, with power supply system 304, the power input 306, the input gate 308, the power converter 310, the power output 312, the power storage subsystem 314, and the controller system 316, and one of skill in the art in possession of the present disclosure will recognize that each of the components includes features that are similar to those discussed above with reference to FIG. 3. However, in addition to the components discussed above with reference to FIG. 3, the MCU in the controller system 316 is illustrated including a monitoring/power provisioning connection 402 to the circuit at a circuit location 402a that is between the capacitor C1 and each of the input gate 308 and the inductors L1 and L2, which as discussed below allows the MCU to both provide power to that circuit location 402a and monitor the voltage at that circuit location 402a. However, while a specific circuit and configuration for the power converter device is illustrated in FIG. 4, one of skill in the art in possession of the present disclosure will recognize that power converter device health check system may include a variety of components and configurations while remaining within the scope of the present disclosure as well Referring now to FIG. 5, an embodiment of a method 500 for providing a health check for a power converter device is illustrated. As discussed below, the systems and methods of the present disclosure provide for detection of a low-side transistor short circuit in a power converter device prior to providing system power to that power converter device in order to prevent failure of the power converter device. For example, a controller device in the power converter device may prevent first power from being provided to a low-side transistor via a power input and may turn off the low-side transistor. The controller device may then provide second power to a circuit location between the low-side transistor and a capacitor that is in parallel with the low-side transistor. Subsequently, the controller device may determine whether a charge of the capacitor is below a threshold charge level and, if so, transmit a power converter warning message while, if not, allow the first power to be provided to the low-side transistor. As such, power converter warning messages may be generated and transmitted in the event a low-side transistor short circuit exists in the power converter device, and power is prevented from being provided to the power converter device that can cause failure of the power converter device.

Figure 6A:
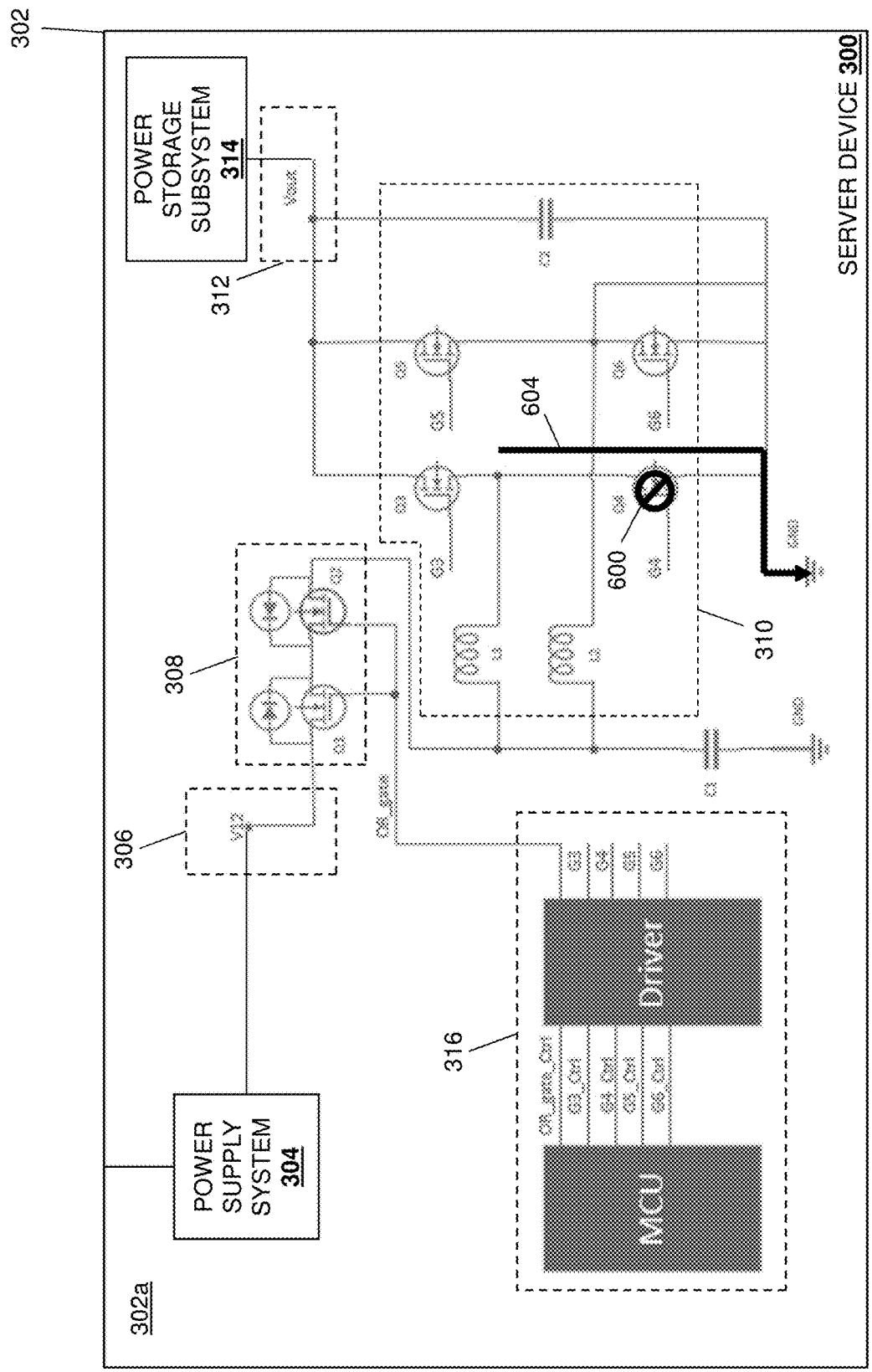
FIG. 6A is a schematic view illustrating an embodiment of the operation of the conventional power converter device in the server device of FIG. 3.
Figure 6B:
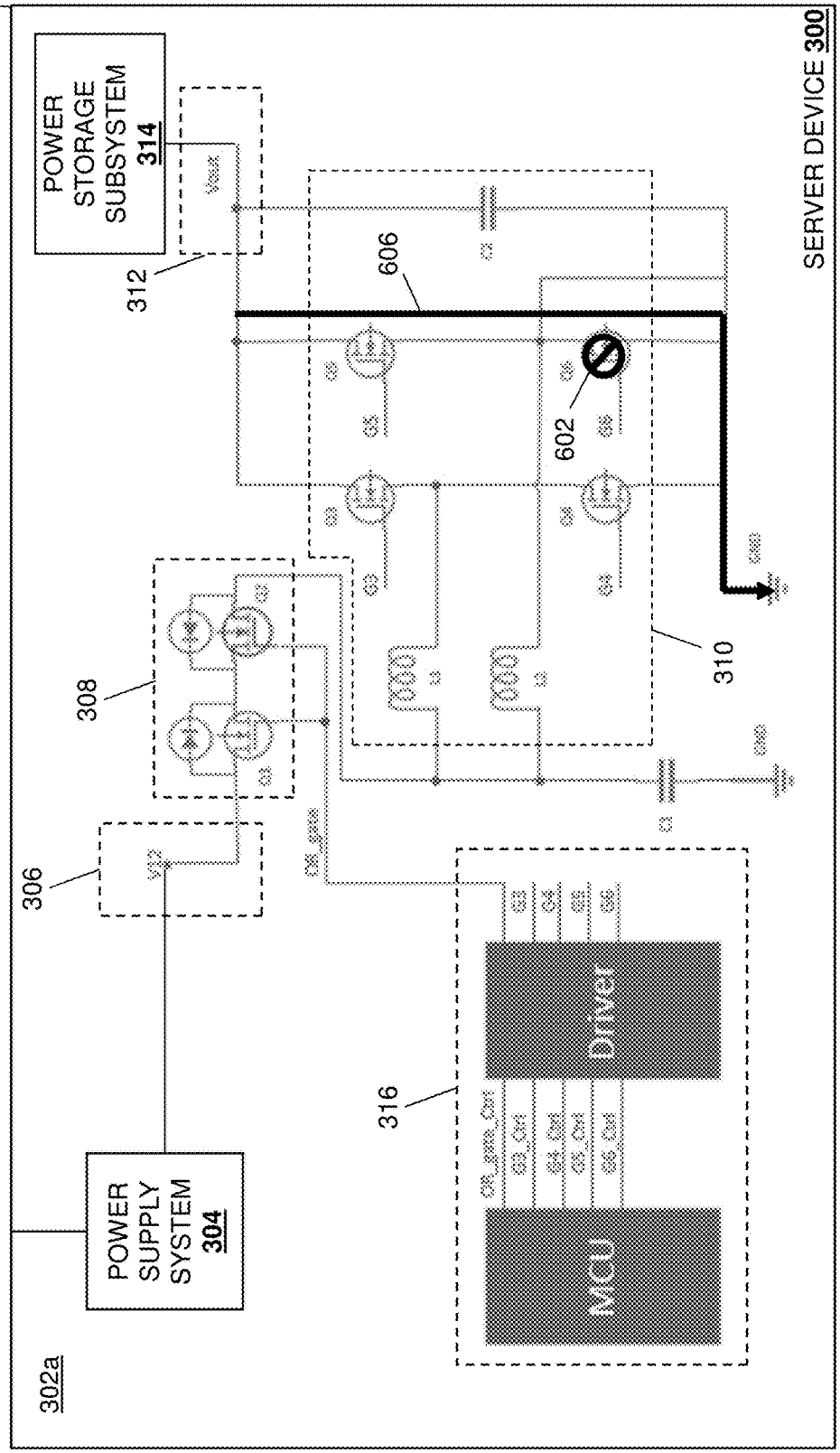
FIG. 6B is a schematic view illustrating an embodiment of the operation of the conventional power converter device in the server device of FIG. 3.

With reference to FIGS. 6A and 6B, the server device including the conventional power converter device of FIG. 3 is provided in order to briefly describe its conventional operation. As illustrated in FIG. 6A, the transistor Q4 in the power converter 310 (e.g., a low-side MOSFET device in one example) includes a fault that provides a short circuit (as illustrated by element 600) to ground GND. Similarly, as illustrated in FIG. 6B, the transistor Q6 in the power converter 310 (e.g., a low-side MOSFET device in one example) includes a fault that provides a short circuit (as illustrated by element 602) to ground GND. During conventional operation of the server device 300 and power converter device, initialization of the server device 300 (e.g., in response to boot operations) results in the turning on of the transistor Q1 or Q2 in the input gate 308 in order to allow power from the power supply system 304 to be provided via the power input 306 to the power converter 310, as well as the turning on of the transistors Q3, Q4, Q5 and Q6 in the power converter 310.

As illustrated in FIG. 6A, in situations in which the transistor Q4 includes the fault that provides the short circuit, and in response to the initialization of the server device discussed above, the power from the power supply system 304 that is provided via the power input 306 to the power converter 310 shorts directly to ground GND, as illustrated by element 604. Similarly, as illustrated in FIG. 6B, in situations in which the transistor Q6 includes the fault that provides the short circuit, and in response to the initialization of the server device discussed above, the power from the power supply system 304 that is provided via the power input 306 to the power converter 310 shorts directly to ground GND, as illustrated by element 606. As will be appreciated by one of skill in the art in possession of the present disclosure and as discussed above, the shorting of the power provided by the power supply system 304 to the power converter 310 directly to ground GND can result in failure of one or more components of the power converter device, which may prevent operations of the power converter device and/or the system that utilizes it. As such, when the power converter device is utilized by a BBU device as discussed above, the failure of the BBU device may prevent its power backup operations for memory devices in the server device 300, which can result in data loss in the event power from the power supply system 304 becomes unavailable. As discussed below, the server device 400 and power converter device of the present disclosure may prevent such failures by preventing power to the power converter device until it is determined that no fault/short circuit exists in the low-side transistors/MOSFET devices.

The method 500 begins at block 502 where a controller device prevents power from being provided to a power converter in a circuit. In an embodiment, at block 502, the MCU in the controller system 316 may operate to prevent power from being provided to the power converter 310. For example, upon boot, power-up, and/or other initialization of the server device 400, the MCU in the controller system 316 may operate to provide a control communication 700 to the Driver in the controller system 316 (e.g., via its OR_gate Ctrl connection to the Driver) that causes the Driver to turn off the transistors Q1 and Q2 in the input gate 308. As will be appreciated by one of skill in the art in possession of the present disclosure, the turning off of the transistors Q1 and Q2 operates to turn off the input gate 308 in order to prevent power (e.g., 12 volt power) provided by the power supply system 304 to the power input 306 during the initialization operations of the server device 400 to be transmitted from the power input 306 to the power converter 310 and the capacitor C1. As such, the turning off of the input gate 308 may be performed prior to the provisioning of the power by the power supply system 304 to the power input 306 in order to ensure that that power does not reach the power converter 310 (and particularly the transistors Q4 and/or Q6 (e.g., low-side MOSFET devices in some examples) that may include a fault that produces a short circuit to ground GND). However, while a specific example of preventing power to the power converter/low-side transistors has been described, one of skill in the art in possession of the present disclosure will appreciated that other powering prevention techniques may be utilized while remaining within the scope of the present disclosure as well.

The method 500 may then proceed to block 504 where the controller device turns off high-side transistor(s) and low-side transistor(s) in the power converter. In an embodiment, at block 504, the MCU in the controller system 316 may operate to turn off high-side transistor(s) and low-side transistor(s) in the power converter 310. For example, the MCU in the controller system 316 may operate to provide control communications 702a, 702b, 702c, and 702d to the Driver in the controller system 316 (e.g., via its G3_Ctrl connection, G4_Ctrl connection, G5_Ctrl connection, and G6_Ctrl connection, respectively, to the Driver) that causes the Driver to turn off the transistors Q3, Q4, Q5, and Q6 in the power converter 310. As will be appreciated by one of skill in the art in possession of the present disclosure, the turning off of the transistors Q3, Q4, Q5, and Q6 operates to prevent any power provided to the input of those transistors Q3, Q4, Q5, and Q6 from flowing through those transistors Q3, Q4, Q5, and Q6 as long as no short circuit exists in those transistors. However, while a specific example of the turning off of two high-side transistors and two low-side transistors has been described, one of skill in the art in possession of the present disclosure will appreciated that different numbers and/or combinations of transistors may be turned off depending on the circuit configuration while remaining within the scope of the present disclosure as well.

The method 500 may then proceed to block 506 where the controller device provides power to a circuit location between the low-side transistor(s) and a capacitor that is in parallel with the low-side transistor(s). In an embodiment, at block 506, the MCU in the controller system 316 may operate to provide power via the monitoring/power provisioning connection 402 to the circuit location 402a. For example, as will be appreciated by one of skill in the art in possession of the present disclosure, the MCU in the controller system 316 may receive 3.3 volts of power (e.g., from the power supply system 304 (e.g., via a secondary power rail, etc.) and/or other power source/supply provided in and/or to the server device 400) that allows for its operation during and subsequent to the initialization of the server device 400. As such, at block 506 the MCU in the controller system 316 may transmit that 3.3 volts of power (or some portion of it) via the monitoring/power provisioning connection 402 to the circuit location 402a. However, while the transmission of a particular power amount (and in particular, a second power amount (3.3V) that is less than the first power amount (12V) provided by the power supply system) is described, one of skill in the art in possession of the present disclosure will recognize that a variety of power amounts may be provided to the circuit location 402a at block 506 while remaining within the scope of the present disclosure as well.

As will be appreciated by one of skill in the art in possession of the present disclosure, the provisioning of power by the MCU in the controller system 316 to the circuit location 412a via the monitoring/power provisioning connection 402 will produce different results in the capacitor C1 depending on whether or not a short circuit exists in one (or both) of the transistors Q4 and Q6 (e.g., low-side MOSFET devices in one example). For example, in the event no short circuit exists in either of the transistors Q4 and Q6, the power provided by the MCU in the controller system 316 to the circuit location 412a via the monitoring/power provisioning connection 402 will operate to generate a charge on the capacitor C1 due to each of the transistors Q3, Q4, Q5, and Q6 being turned off (and thus not allowing the flow of power through them). However, in the event a short circuit exists in either (or both) of the transistors Q4 and Q6, the power provided by the MCU in the controller system 316 to the circuit location 412a via the monitoring/power provisioning connection 402 will not operate to generate a charge on the capacitor C1, as the short circuit in either (or both) of the transistors Q4 and Q6 will allow the power provided by the MCU in the controller system 316 to the circuit location 412a via the monitoring/power provisioning connection 402 to flow to ground GND via that short circuit (i.e., despite that transistor being turned off.)

Figure 7A:
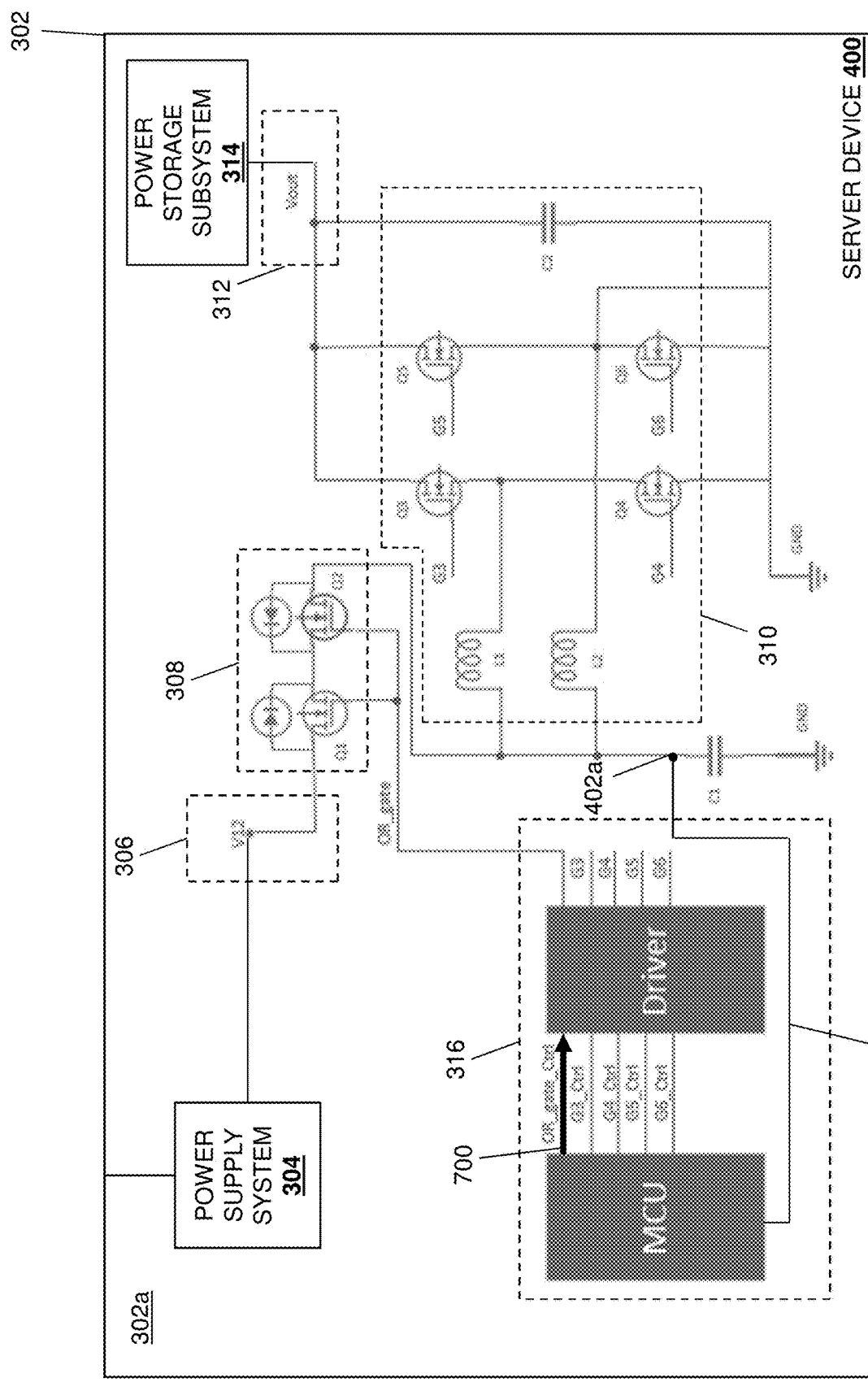
FIG. 7A is a schematic view illustrating an embodiment of the power converter device health check system in the server device of FIG. 3 operating during the method of FIG. 4.
Figure 7B:
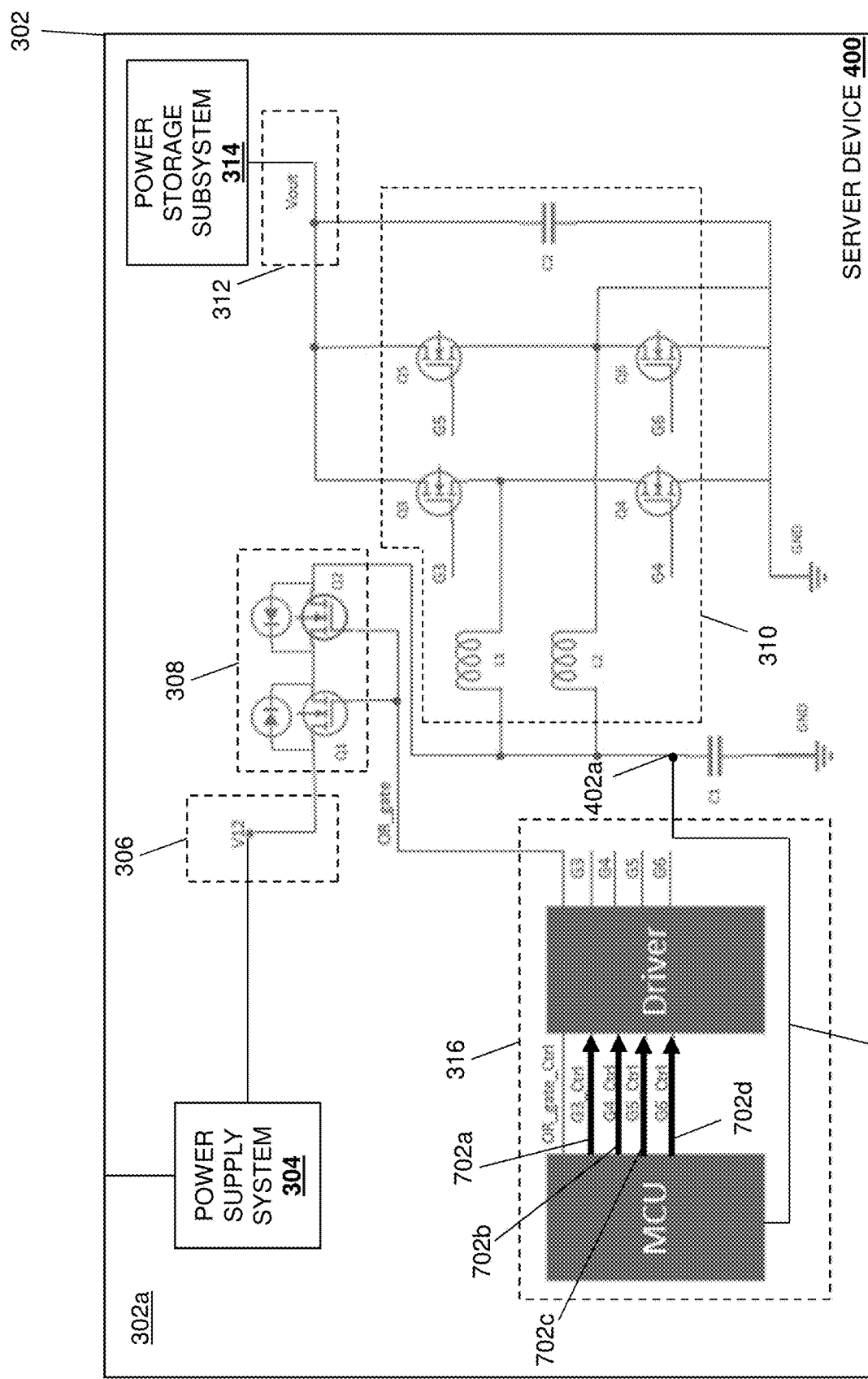
FIG. 7B is a schematic view illustrating an embodiment of the power converter device health check system in the server device of FIG. 3 operating during the method of FIG. 4.
Figure 7C:
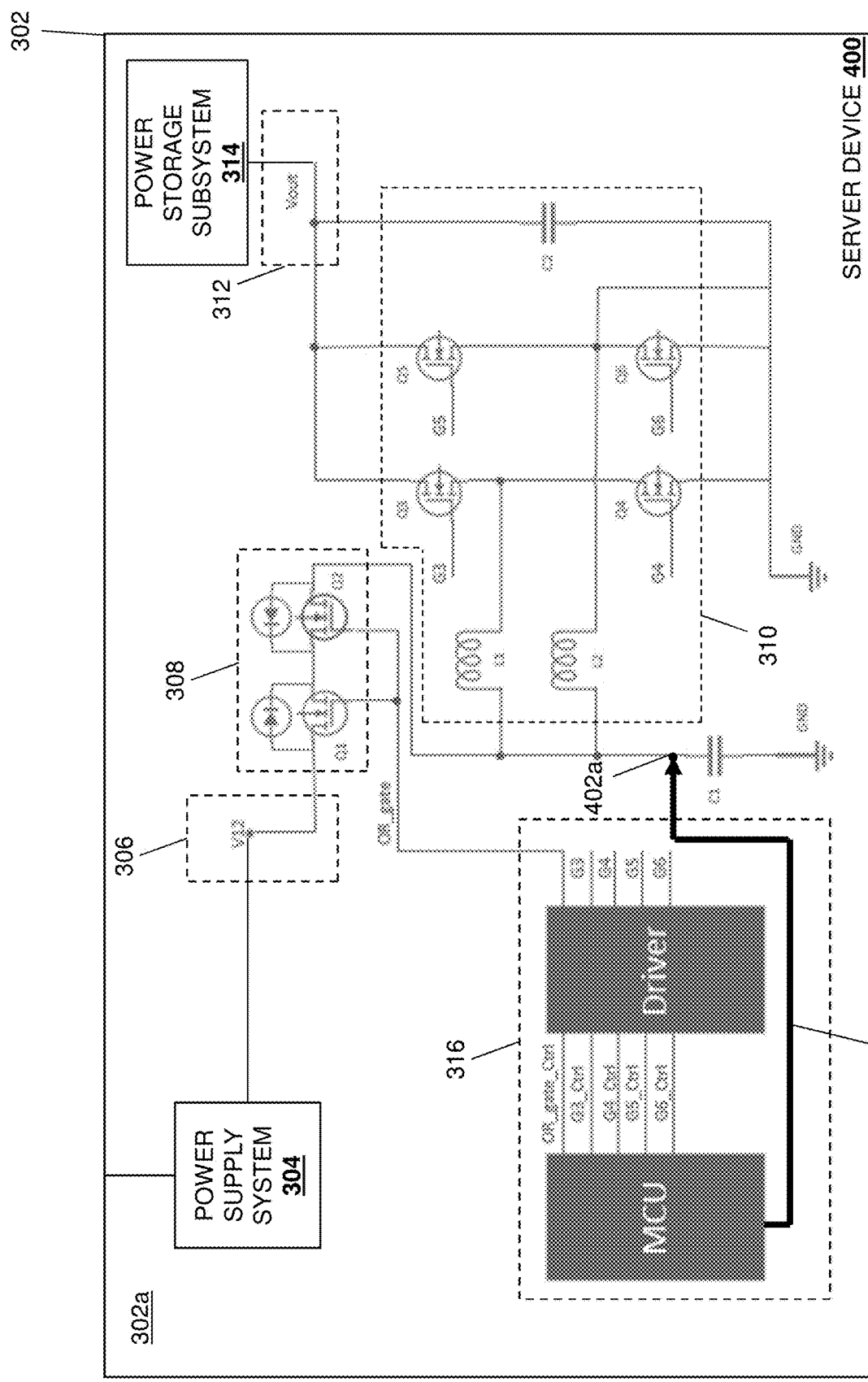
FIG. 7C is a schematic view illustrating an embodiment of the power converter device health check system in the server device of FIG. 3 operating during the method of FIG. 4.
Figure 7D:
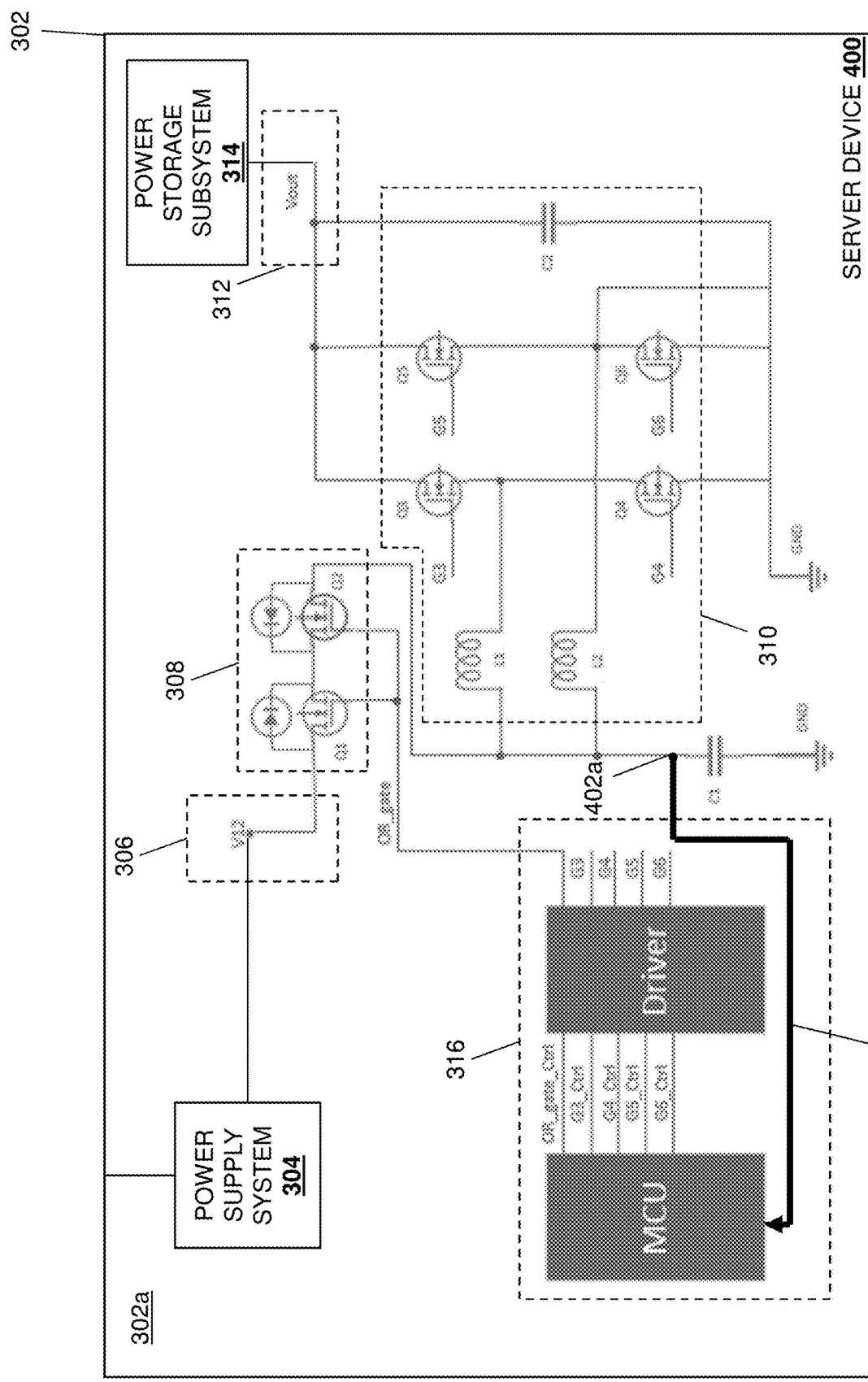
FIG. 7D is a schematic view illustrating an embodiment of the power converter device health check system in the server device of FIG. 3 operating during the method of FIG. 4.

The method 500 then proceeds to decision block 508 where it is determined whether a capacitor charge is below a threshold level. In an embodiment, at decision block 508, the MCU in the controller system 316 may operate to determine whether a charge on the capacitor C1 exceeds a threshold level. For example, as illustrated in FIG. 7D, the MCU in the controller system 316 may operate to perform monitoring operations 706 via the monitoring/power provisioning connection 402 to determine the charge on the capacitor C1. As such, at decision block 508, the MCU in the controller system 316 may determine the charge on the capacitor C1 and compare that charge to a threshold charge amount that may be stored in a storage subsystem included in and/or coupled to the MCU in the controller system 316. In the example provided above, the MCU in the controller system 316 provides 3.3 volts of power to charge the capacitor C1, and one of skill in the art in possession of the present disclosure will appreciate that in the event no short circuit exists in the transistors Q4 and Q6, after some time period the capacitor C1 will charge to a charge level that is relatively close to 3.3V (e.g., 3.1V.) As such, following the beginning of the provision of power to the circuit location 402a, the MCU in the controller system 316 may wait some time period that allows the capacitor C1 to charge using that power (assuming no short circuit exists in the transistors Q4 and Q6), and then determine the charge on the capacitor C1 and compare it to the charge level threshold.

However, as discussed above, a short circuit provided by either (or both) of the transistors Q4 and Q6 may prevent any substantial charge from building up in the capacitor C1 and, as such, in some examples the determination of whether the charge on the capacitor C1 is below the threshold level may simple include the MCU in the controller system 316 determining that any amount of charge exists on the capacitor C1 (i.e., that the charge on the capacitor C1 is above the threshold level), or determining that no charge exists on the capacitor C1 (i.e., that the charge on the capacitor C1 is below the threshold level). However, while a few specific examples of determining whether a capacitor charge is below a threshold level have been described, one of skill in the art in possession of the present disclosure will appreciated that a variety of techniques may be utilized to determine whether the capacitor C1 has been charged by the power provided by the MCU in the controller system 316 while remaining within the scope of the present disclosure as well. Furthermore, while specific examples of threshold charge levels have been described, one of skill in the art in possession of the present disclosure will recognize that any of a variety of threshold charge levels may be utilized while remaining within the scope of the present disclosure as well.

If, at decision block 508, it is determined that the capacitor charge is above the threshold level, the method 500 proceeds to block 510 where the controller device turns on the high-side transistor(s) and low-side transistor(s) in the power converter. As discussed above, in the event the capacitor C1 charges above the threshold charge level in response to the power provided by the MCU in the controller system 316 to the circuit location 402a, the MCU may assume that there is no short circuit in the transistors Q4 and Q6, and thus that it is safe to provide power from the power supply system 304 to the power converter 310. As such, at block 510, the MCU in the controller system 316 may provide control communications to the Driver in the controller system 316 (e.g., similar to the control communications 702a-702d illustrated in FIG. 7B) that cause the Driver to turn on the transistors Q3, Q4, Q5, and Q6. The method 500 then proceeds to block 512 where it the controller device allows power to be provided to the power converter in the circuit. In an embodiment, at block 512, MCU in the controller system 316 may operate to provide a control communication to the Driver in the controller system 316 (e.g., similar to the control communication 700 illustrated in FIG. 7A) that causes the Driver to turn on the transistors Q1 and Q2, which one of skill in the art in possession of the present disclosure will recognize allows power from the power supply system 304 that is provided to the power input 306 to be provided through the input gate 308 and to the power converter 310. As discussed above, due to the proper functioning of the transistors Q4 and Q6 that was confirmed at block 508 (i.e., no short circuits in the low-side MOSFET devices), the power converter 310 may operate to convert the power provided by the power supply system 304, and provide that converted power to the power output 312 for use by the power storage subsystem 314.

If at decision block 508, it is determined that the capacitor charge is below the threshold level, the method 500 proceeds to block 514 where the controller device performs circuit fault operations. As discussed above, in the event the capacitor C1 does not charge above the threshold charge level in response to the power provided by the MCU in the controller system 316 to the circuit location 402a, the MCU may assume that there is a short circuit in one (or both) of the transistors Q4 and Q6, and thus that it is not safe to provide power from the power supply system 304 to the power converter 310. As such, at block 510, the MCU in the controller system 316 may perform circuit fault operations that may include the MCU in the controller system 316 continuing to prevent the power from being supplied by the power supply system 304 to the power converter 310 (e.g., by keeping the transistors Q1 and Q2 turned off), generating a circuit fault warning that is displayed to a user or administrator of the server device 400 (e.g., "POWER CONVERTER FAULT CONDITION EXISTS THAT MAY RESULT IN FAILURE OF THE POWER CONVERTER"), and/or performing other circuit fault operations that would be apparent to one of skill in the art in possession of the present disclosure. As such, in the event a short circuit exists in a low-side transistor in the power converter 310, operation of the power converter device may be disabled and a warning provided so that the power converter device does not fail.

Thus, systems and methods have been described that provide for detection of a low-side MOSFET device short circuit in a BBU device prior to providing system power to that BBU device in order to prevent failure of the BBU device. For example, a controller device in the BBU device may prevent 12 volts from being provided to a low-side MOSFET device via a power input and may turn off the low-side MOSFET device. The controller device may then provide 3.3 volts of power to a circuit location between the low-side MOSFET device and a capacitor that is in parallel with the low-side MOSFET device. Subsequently, the controller device may determine whether a charge of the capacitor is below a threshold charge level and, if so, transmit a BBU device warning message while, if not, allow the first power to be provided to the low-side MOSFET device. As such, BBU device warning messages may be generated and transmitted in the event a low-side MOSFET device short circuit exists in the BBU device, which may prevent power from being provided to the BBU device that can cause failure of the BBU device Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power converter device health check system, comprising:
   a power input;
   a power output;
   a circuit that connects the power input to the power output and that includes a first transistor that is directly coupled to ground, a second transistor that is directly coupled to the power output and in series with the first transistor, and a capacitor that is in parallel with the first transistor; and
   a controller device that is coupled to the circuit and that is configured to:
     prevent first power from being provided from at least one power source to the first transistor via the power input;
     turn off the first transistor;
     turn off the second transistor;
     provide, while preventing the first power from being provided from the at least one power source to the first transistor via the power input and with the first transistor and the second transistor turned off, second power from the at least one power source to a circuit location in the circuit between the first transistor and the capacitor;
     determine, subsequent to providing the second power from the at least one power source to the circuit location in the circuit between the first transistor and the capacitor, whether a charge of the capacitor is below a threshold charge level; and
     transmit, in response to determining that the charge of the capacitor is below the threshold charge level, a power converter warning message.

2. The system of claim 1, wherein the first transistor is a low-side transistor, and the second transistor is a high-side transistor.

3. The system of claim 1, further comprising:
   an input gate that is included in the circuit and that is located between the power input and each of the first transistor and the capacitor, wherein the controller is configured to prevent the first power from being provided from the at least one power source to the first transistor via the power input by turning off the input gate.

4. The system of claim 1, wherein the controller is configured to:
   allow, in response to determining that the charge of the capacitor is above the threshold charge level, the first power to be provided from the at least one power source to the first transistor via the power input.

5. The system of claim 1, wherein the second power is a lower voltage power than the first power.

6. The system of claim 1, wherein the circuit includes a third transistor that is directly connected to ground and in parallel with the first transistor, and wherein the controller is configured to:
   prevent the first power from being provided from the at least one power source to the third transistor via the power input;
   turn off the third transistor;
   provide, while preventing the first power from being provided from the at least one power source to each of the first transistor and the third transistor via the power input and with each of the first transistor, the second transistor, and the third transistor turned off, the second power from the at least one power source to the circuit location in the circuit between the capacitor and each of the first transistor and the third transistor; and
   determine, subsequent to providing the second power from the at least one power source to the circuit location in the circuit between the capacitor and each of the first transistor and the third transistor, whether the charge of the capacitor is below the threshold charge level.

7. The system of claim 1, further comprising:
a Battery Backup Unit (BBU) device that includes the power input, the power output, the circuit, and the controller.

8. An Information Handling System (IHS), comprising:
a processing system; and
a memory system that is coupled to the processing system and that includes instructions that, when executed by the processing system, cause the processing system to provide a controller engine that is configured to:
  prevent first power from being provided from at least one power source via a power input to a first transistor in a circuit that is directly coupled to ground;
  turn off the first transistor;
  turn off a second transistor in the circuit that is directly coupled to a power output and in series with the first transistor;
  provide, while preventing the first power from being provided from the at least one power source to the first transistor via the power input and with the first transistor and the second transistor turned off, second power from the at least one power source to a circuit location in the circuit between the first transistor and a capacitor in the circuit that is in parallel with the first transistor;
  determine, subsequent to providing the second power from the at least one power source to the circuit location in the circuit between the first transistor and the capacitor, whether a charge of the capacitor is below a threshold charge level; and
  transmit, in response to determining that the charge of the capacitor is below the threshold charge level, a power converter warning message.

9. The IHS of claim 8, wherein the first transistor is a low-side transistor, and the second transistor is a high-side transistor.

10. The IHS of claim 8, wherein the controller engine is configured to:
  prevent the first power from being provided from the at least one power source to the first transistor via the power input by turning off an input gate in the circuit that is located between the power input and each of the first transistor and the capacitor.

11. The IHS of claim 8, wherein the controller engine configured to:
  allow, in response to determining that the charge of the capacitor is above the threshold charge level, the first power to be provided from the at least one power source to the first transistor via the power input.

12. The IHS of claim 8, wherein the second power is a lower voltage power than the first power.

13. The IHS of claim 8, wherein the controller engine is configured to:
  prevent the first power from being provided from the at least one power source via the power input to a third transistor in the circuit that is directly connected to ground and in parallel with the first transistor;
  turn off the third transistor;
  provide, while preventing the first power from being provided from the at least one power source to each of the first transistor and the third transistor via the power input and with each of the first transistor, the second transistor, and the third transistor turned off, the second power from the at least one power source to the circuit location in the circuit between the capacitor and each of the first transistor and the third transistor; and
  determine, subsequent to providing the second power from the at least one power source to the circuit location in the circuit between the capacitor and each of the first transistor and the third transistor, whether the charge of the capacitor is below the threshold charge level.

14. A method for providing a health check for a power converter device, comprising:
  preventing, by a controller device, first power from being provided from at least one power source via a power input to a first transistor in a circuit that is directly coupled to ground;
  turning off, by the controller device, the first transistor;
  turning off, by the controller device, a second transistor in the circuit that is directly coupled to a power output and in series with the first transistor;
  providing, by the controller device while preventing the first power from being provided from the at least one power source to the first transistor via the power input and with the first transistor and the second transistor turned off, second power from the at least one power source to a circuit location in the circuit between the first transistor and a capacitor in the circuit that is in parallel with the first transistor;
  determining, by the controller device subsequent to providing the second power from the at least one power source to the circuit location in the circuit between the first transistor and the capacitor, whether a charge of the capacitor is below a threshold charge level; and
  transmitting, by the controller device in response to determining that the charge of the capacitor is below the threshold charge level, a power converter warning message.

15. The method of claim 14, wherein the first transistor is a low-side transistor, and the second transistor is a high-side transistor.

16. The method of claim 14, further comprising:
  preventing, by the controller device, the first power from being provided from the at least one power source to the first transistor via the power input by turning off an input gate in the circuit that is located between the power input and each of the first transistor and the capacitor.

17. The method of claim 14, further comprising:
  allowing, by the controller device in response to determining that the charge of the capacitor is above the threshold charge level, the first power to be provided from the at least one power source to the first transistor via the power input.

18. The method of claim 14, wherein the second power is a lower voltage power than the first power.

19. The method of claim 14, further comprising:
  preventing, by the controller device, the first power from being provided from the at least one power source via the power input to a third transistor in the circuit that is directly connected to ground and in parallel with the first transistor;
  turning off, by the controller device, the third transistor;
  providing, by the controller device while preventing the first power from being provided from the at least one power source to each of the first transistor and the third transistor via the power input and with each of the first transistor, the second transistor, and the third transistor turned off, the second power from the at least one power source to the circuit location in the circuit between the capacitor and each of the first transistor and the third transistor; and determining, by the controller device subsequent to providing the second power from the at least one power source to the circuit location in the circuit between the capacitor and each of the first transistor and the third transistor, whether the charge of the capacitor is below the threshold charge level.

20. The method of claim 14, wherein the power input, the circuit, and the controller device are included in a Battery Backup Unit (BBU) device.

* * * * *